Feb. 23, 1971   L. M. CARREIRA ET AL   3,565,614
IMAGE TRANSFER

Filed April 12, 1966   2 Sheets-Sheet 1

INVENTORS
LEONARD M. CARREIRA
IRA S. STEIN
BY  VSEVOLOD TULAGIN

Ronald Zibelli

ATTORNEY

United States Patent Office 3,565,614
Patented Feb. 23, 1971

3,565,614
IMAGE TRANSFER
Leonard M. Carreira, Webster, and Ira S. Stein and Vsevolod Tulagin, Rochester, N.Y., assignors to Xerox Corporation, Rochester, N.Y., a corporation of New York
Continuation-in-part of application Ser. No. 384,737, July 23, 1964. This application Apr. 12, 1966, Ser. No. 542,050
Int. Cl. G03g 13/16, 13/22
U.S. Cl. 96—1.4                  3 Claims

ABSTRACT OF THE DISCLOSURE

A photoelectrophoretic imaging system is described in which the formed image is electrostatically transferred. The color balance of the image may be modified during transfer by exposure to suitable electromagnetic radiation.

---

Figure 1:
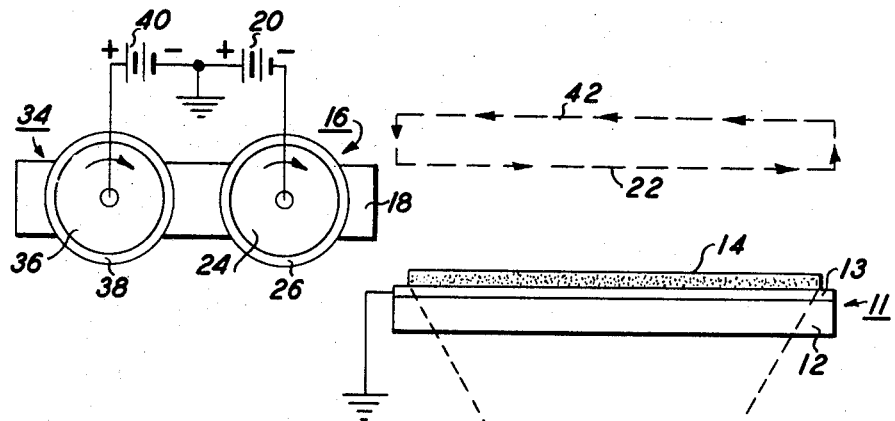

This invention relates in general to imaging systems and more specifically to a photoelectrophoretic imaging system.

This application is a continuation-in-part of application Ser. No. 384,737, filed July 23, 1964, now U.S. Pat. 3,384,565 issued May 21, 1968 to V. Tulagin and L. M. Carreira, both applications being assigned to the same assignee.

In photoelectrophoretic imaging, the imaging particles which are generally intensely colored are suspended in an insulating carrier liquid. This suspension is then placed between a pair of electrodes, subjected to a potential difference and exposed to an image to be reproduced. Ordinarily, when carrying out the process, the imaging suspension is placed on a transparent electrically conductive plate in the form of a thin film and exposure is made through the bottom of this plate while a second electrode is brought into contact with the top of the suspension, while a potential is applied across the two electrodes. The particles are believed to bear an initial charge when suspended in the liquid which causes them to be attracted to the transparent base electrode and to change polarity by exchanging charge with this base electrode upon exposure so that the exposed particles migrate across to the upper electrode to form an image on the base electrode by particle subtraction. This image is clearly and easily visible on the base electrode after the upper electrode carrying the particles which are not used to form part of the image is separated from the base electrode. The system may be used to produce monochromatic images by using a single color of particles in the suspension or a number of differently colored particles in the suspension which respond to the light exposure. In polychromatic systems, mixtures of two or more differently colored particles which are each sensitive only to light of a specific different wavelength or narrow range of wavelengths are used. Thus, for example, a full color image may be produced by using a mixture of cyan, magenta and yellow particles which respond to red, green and blue light respectively. An extensive and detailed description of a photoelectrophoretic imaging technique of the type described above is found in copending application Ser. No. 384,737, filed July 23, 1964, now U.S. Pat. 3,384,565 which is incorporated herein by reference.

Although the electrophoretic imaging technique generally described above has been found to be capable of producing excellent quality images in both monochromatic and polychromatic systems, it is frequently undesirable to leave the final image on the transparent base electrode. Thus, for example, when a very high quality optically flat reusable electrode is employed, the use of a new electrode each time the imaging process is carried out might make the process prohibitively expensive for certain applications. Another problem is that the electrode may not have any physical properties most desired as the final imaging substrate so that if the image is made on a conductive transparent glass substrate, it must be transferred to some other surface if a flexible print is to be produced. Although transfer of the image may be accomplished by bringing an adhesive into contact with it and stripping it away, such adhesive materials are relatively expensive and frequently difficult and messy to work with. In addition to the aforementioned problems it has also been found that there is sometimes left behind on the electrode some unwanted imaging particles that tend to form a dirty background on the final image, and in other instances where a polychromatic color system is involved the color balance of the image as formed on the electrode needs corrections because one or more of the particles in the system responds to the imaging steps either more or less vigorously than it should to form a perfect color image of the original.

Accordingly, it is an object of this invention to provide a novel transfer system for electrophoretic imaging.

It is a further object of the invention to provide a novel photoelectrophoretic imaging transfer apparatus.

Still another object of the invention is to provide a photoelectrophoretic imaging transfer system which reduces the background in the transferred images.

A still further object of the invention is to provide a photoelectrophoretic imaging transfer system which can be employed for color correction of full color images simultaneously with the transfer of the image.

Further objects will become apparent to those skilled in the art as the disclosure is more fully made.

The above and still further objects may be accomplished in accordance with the present invention by transfer of the image after it has been formed on one of the imaging electrodes by bringing a transfer substrate into close proximity with the formed image and applying an electrical field across the image in such a diretcion as to transfer it (i.e., the image) to the transfer substrate. Any suitable technique may be employed for applying the electrical field including, for example, bringing a roller, plate or other conductive elements connected to a high potential source closely adjacent to the back of the transfer substrate or applying a high potential corona discharge to the back of the transfer substrate while bringing it into proximity with the image. Since it is believed that the particles remaining after the imaging electrode has passed over the imaging suspension, have a non-uniform charge distribution, that is, some are positively charged and some are negatively charged, the polarity of the applied field can be either positive or negative. In its preferred form, however, the polarity of the applied field will be opposite to the polarity applied to the imaging electrode; thus, if the imaging electrode is negatively charged, the transfer electrode is positively charged, and vice versa. This is so because it is believed that the majority of the particles constituting the particle image are charged the same as the charge on the imaging electrode. Such particles will be attracted to an oppositely charged electrode and, accordingly, a cleaner image will result with less undesirable background transfer. The magntiude of the applied field should be sufficient to overcome the attraction between the image particles and the base electrode, thereby effecting the transfer of the remaining portion of the imaging suspension to the transfer substrate. The invention also comprehends use of light or other actinic electromagnetic radiation during the transfer step to improve, alter or otherwise modify transfer. It has been found, for example, that transfer from the base electrode onto the transfer substrate is more efficient when exposure of the image to the original being reproduced is continued during the transfer step. Transfer can also be effected when the image is illluminated uniformly with white light during the transfer step. In another modification of the process, filtered light of selected wavelengths may be used to expose the image during transfer for color correction or partial image transfer of polychromatic images using imaging particles of two or more colors.

The nature of the invention will be more easily understood when it is considered in conjunction with the accompanying drawings of exemplary preferred embodiments of the invention wherein FIGS. 1–4 are side sectional views of four different apparatus embodiments of the invention.

Referring now to FIG. 1, there is seen a transparent electrode generally designated 11 which in this instance is made up of a layer of optically transparent glass 12 overcoated with a thin optically transparent layer 13 of tin oxide. This oxide coated glass is commercially available under the trade name NESA glass from the Pittsburgh Plate Glass Company of Pittsburgh, Pa. This base electrode will be referred to hereinafter as the "injecting" electrode. Coated on the upper surface of electrode 11 is a thin layer 14 of finely divided photosensitive particles dispersed in an insulating carrier liquid. This suspension may also contain binders for the particles which are dissolved or suspended along with the particles in the carrier liquid. Adjacent electrode 11 is a roller electrode generally designated 16 mounted for rotation on a rigid plate 18. The electrode 16 is connected in this instance to the negative side of a potential source 20 with the opposite side of the source being connected to ground. Since the tin oxide layer of injecting electrode 11 is also connected to ground, an electric field is applied across the liquid suspension when electrode 16 rolls across the surface of electrode 11 in the direction indicated by the arrow 22 in the drawing. Electrode 16 is made up of a central core 24 which is preferably of fairly high electrical conductivity and this core is covered with a layer of a blocking electrode material 26, which may, for example, consist of Baryta paper (a paper coated with a gelatin suspension of barium sulphate). An image projector made up of a light source 28, a transparency 30, and a lens 32 is provided to expose suspension 14 to a light image of the original transparency 30 to be reproduced. This electrode surface 26 collects unwanted (i.e. exposed) particles from suspension 14 as it rolls across electrode 11 during exposure, as explained in copending application 384,737, now U.S. Pat. 3,384,565, and leaves a particle image corresponding to the transparency to be reproduced on electrode 11.

Once the particle image is formed on electrode 11, it may, among other things, be desired (for the reasons heretofore given) to transfer the image from the electrode to another surface so that the electrode may be reused. It has been found that this particle image can be efficiently transferred to a more desirable surface by bringing a transfer substrate into close proximity with the formed particle image and applying an electric field across the image in such a direction so as to transfer it to the transfer substrate.

Referring back to FIG. 1, there is seen a third electrode generally designated 34 which is, in this instance, also mounted for rotation on rigid plate 18. This electrode 34 will be referred to hereinafter as the transfer electrode. Transfer electrode 34 is, in this embodiment, similar in construction to electrode 16; that is, electrode 34 is made up of a conductive core 36 covered with a transfer surface 38, such as Baryta paper sleeve, regular bond paper or onion skin paper. Conductive core 36 is connected by any suitable means to a potential source 40. The potential applied to conductive core 36 is, in this embodiment, of opposite polarity to the potential applied to electrode 16.

Accordingly, electrode 34 is connected to the positive side of potential source 40 with the opposite side of the source being connected to ground. Since the tin oxide layer 13 on injecting electrode 11 is also connected to ground, an electric field is applied across liquid suspension 14 when electrode 34 rolls across the surface of electrode 11 in the direction indicated by arrow 22 in the figure. In this manner, the particle image is cleanly transferred to transfer electrode 34. If transfer electrode 34 is covered with a removable transfer surface, such as Baryta paper sleeve, for example, as previously disclosed, the complete image is transferred to surface 38, which can then be removed and replaced with a new sleeve for use in subsequent transfers. After electrodes 16 and 34 have traveled across liquid suspension 14 in the direction indicated by arrow 22, they are raised slightly and returned to their initial position along the path indicated by arrow 42.

Figure 2:
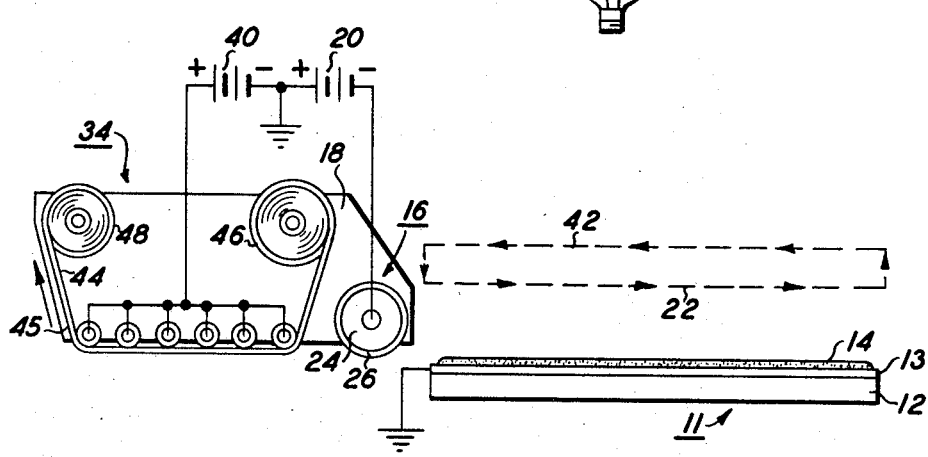

FIG. 2 shows an alternate embodiment of the structure of transfer electrode 34. In this embodiment, transfer electrode 34 is made up of a continuous web 44 of a conductive material having a suitable transfer surface 45. Web 44 is carried by plate 18 in the form of a roll 46 which after use is stored on wind-up spool 48. Potential source 40 is connected to the back of web 44 by any suitable means, such as by a set of conductive rollers 50. The electric field applied to the back of web 44 is, once again, of opposite polarity to that of electrode 16 so that the particles left behind during the passage of electrode 16 are attracted to web 44.

Figure 3:
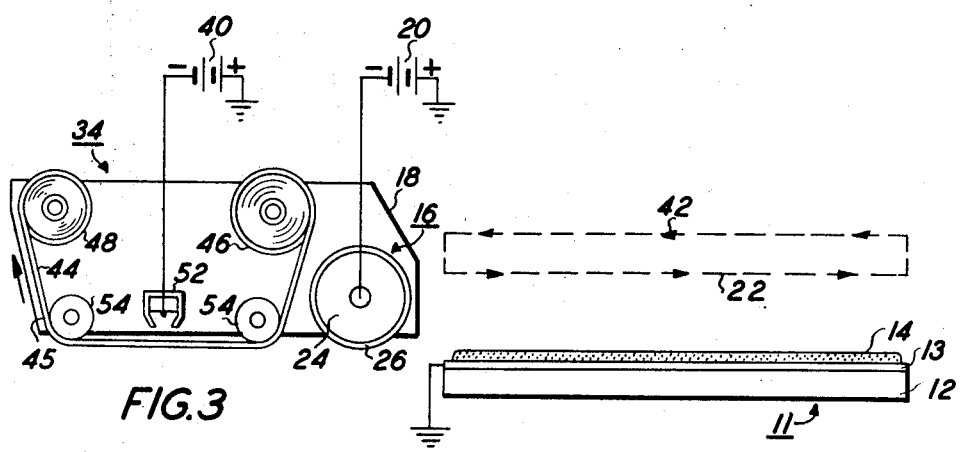

FIG. 3 shows an alternate embodiment of the manner in which the field is applied across the imaging suspension. In this figure, like numerals have been used to identify parts of the apparatus which are identical to those previously described with respect to FIGS. 1 and 2. The embodiment shown here in FIG. 3 is the same as the FIG. 2 embodiment except for the distinctions hereinafter noted, including the fact that the potential is applied to the back of transfer web 44 by means of high potential corona discharge device 52. Such a deviec is more fully descdibed in U.S. Pat. 2,588,699. Rollers 54 are used to keep the transfer web surface under tension sufficient to maintain the transfer surface in a flat condition, whereby its entire applicable surface is placed in direct contact with liquid suspension 14 during the transfer step. Each potential source 20 and 40 is individually grounded rather than having their opposite poles connected and then grounded as in FIG. 2. Here, as distinguished from FIGS. 1 and 2, the polarity of the potential applied to electdode 34 is the same as the polarity of the potential applied to electrode 16. As has previously been set forth, since it is believed that the particles, remaining after the imaging electrode has passed over the imaging suspension, have a non-uniform charge distribution, that is, some are positively charged and some are negatively charged, the polarity of the applied field can be either positive or negative. In this particular embodiment an imaging apparatus is shown wherein the polarity of the field applied to the transfer electrode is negative (i.e., the same polarity as is applied to the imaging electrode).

Figure 4:
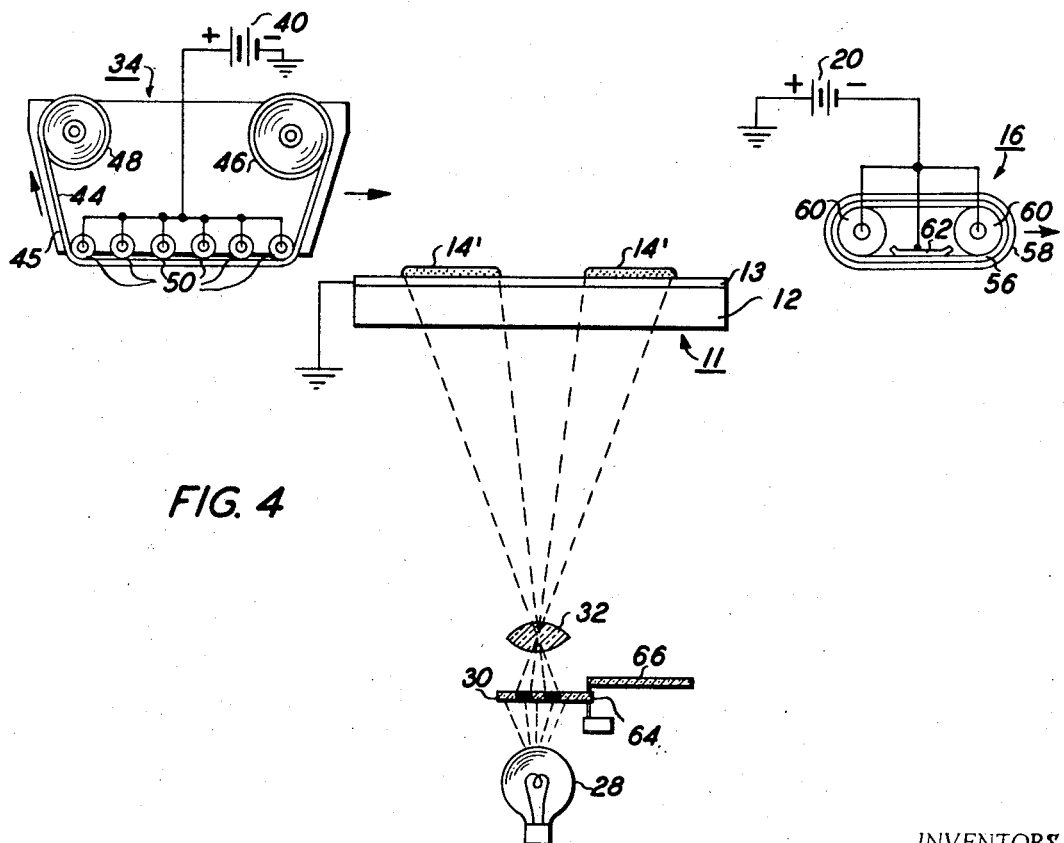

FIG. 4 represents a side sectional view of an embodiment of the invention after imaging electrode 16 has rolled over the exposed photosensitive suspension. In this instance, imaging electrode 16 is of the "tractor" type having a conduitive inner web 56 covered with a layer of blocking electrode material 58, such as Baryta paper. Electrode 16 is connected to the negative side of a potential source 20 by means of roller contacts 60 and plate contact 62. The roller contacts also perform the auxiliary function of holding surface 58 under tension sufficient to maintain that surface in a flat condition, thereby enabling the entire applicable surface to be placed in direct contact with exposed suspension 14 as electrode 16 rolls thereover during the imaging operation. In this embodiment of the invention, electrode 16 has been caused to roll across the top surface of injecting electrode 11 during the period of image exposure. This light exposure causes the exposed particles originally attracted to electrode 11 to migrate through the suspension and adhere to surface 58 of electrode 16, leaving behind a particle image 14' on the injecting electrode surface which is a duplicate of original transparency 30. Passage of transfer electrode 34 over injecting electrode 11 during application of an electric field across the image 14' will cause the image to adhere to transfer surface 44, thereby resulting in a duplicate of original transparency 30 on transfer surface 44.

As explained in Ser. No. 384,737 now U.S. Pat. 3,384,565, the system can produce monochromatic or polychromatic images depending upon the type and number of particles suspended in the liquid carrier and the color of light to which the suspension is exposed in the process.

In addition to transferring image 14' to the surface of injecting electrode 11 to transfer surface 38 or 44 by applying an electric field across the particle image, it has now been found, quite unexpectedly, that exposure to actinic electromagnetic radiation during the transfer operation enhances the transfer of the final image. In one aspect of this illumination, exposure through transparency 30 is continued during the passage of electrode 34 over the surface of injecting electrode. This imagewise exposure has been found to result in a more efficient transfer of particle image 14' than when transfer is accomplished in the absence of additional actinic electromagnetic radiation.

In another aspect, it has been found that transfer may be aided by flooding particle image 14' uniformly with white light during transfer. This can be accomplished by rotating original transparency 30 around pivot 64 (see FIG. 4) so that it is out of the path of the white light emanating from source 28.

It is also contemplated that transfer can be effected by electrode 34 while image 14' is subject to actinic electromagnetic radiation having a single wavelength or a selected band of wavelengths, which can be accomplished by any suitable means, for example, by rotating transparency 30 about pivot 64 out of the path of illumination from light source 28 and moving filter 66, also pivoted about point 64 for convenience into said illumination path. In the event that more than one type of photosensitive particle is used in the imaging suspension, each type being responsive to a different (or overlapping) portion of the visible spectrum, it has been found that an excellent transfer occurs when the particle image is flooded uniformly with actinic electromagnetic radiation having a wavelength (or a selected band of wavelengths) at which the particles in suspension 14 are equally responsive or as nearly equally responsive as nature permits. For example, where the suspension comprises a dispersion of phthalocyanine, Algol Yellow, and Watchung Red in a liquid carrier (as described in Ser. No. 384,737 now U.S. Pat. 3,384,565), effective transfer occurs when the particle image is flooded with blue light of approximately 400 m$\mu$ wavelength. Thus, it has been found that a relatively low intensity light of correct wavelength is far more effective than white light (whose absolute intensity made the orders of magnitude greater, yet produces less than complete transfer). It is also contemplated that transfer can be effected by electrode 34 while image 14' is subjected to actinic electromagnetic radiation which is passed through both transparency 30 and filter 66, thereby resulting in imagewise illumination of a particular wavelength (or a selected band of wavelengths only).

With respect to the production of color images (that is where suspension 14 contains two or more photosensitive particles which are responsive to different wavelengths in the visible portion of the spectrum) it has been found that proper illumination, as hereinafter described, during transfer will aid in color correction of the final image (i.e., the image transferred to electrode 34), should a color imbalance exist in the image 14' as it is viewed on electrode 11 prior to transfer. For purposes of illustration, this aspect of the invention will be described with reference to a suspension having three photosensitive particles; namely, cyan, yellow and magenta therein.

After image 14' is formed by the passage of electrode 16 over the surface of injecting electrode 11, the image may look to be off color (i.e., imbalanced) because of an unexpected photoresponse in one or more of the particles in suspension 14. For example, if the image is viewed in white light and it appears to be too red, this is because the cyan particles responded too readily to the original exposure so that there are not enough cyan particles left behind in image 14' to filter out the proper amount of red light from the white light source. To remedy this color imbalance, it will be necessary to transfer magenta and yellow particles to the transfer electrode 34 at a relatively lower rate than cyan particles are transferred. It has been found that this color correction can be achieved by illuminating image 14' with a light source which is deficient in the color (or colors) corresponding to the particle (particles) which has (have) exhibited the unexpected photoresponse.

Referring to the example where the image 14' is too red, the final image can be corrected for this imbalance by illuminating the image during transfer with light which is deficient in red light. This can be achieved by passing light from source 28 through a cyan filter 66. In an analogous manner, if the image appears to be too blue when viewed in white light, transfer is conducted while the image is subjected to illumination from a light source which is deficient in blue light (e.g., by passing white light through a yellow filter) and if the image appears to be too green, then transfer is conducted while the image is illuminated with a light source which is deficient in green light (e.g., by passing white light through a magenta filter). Passage of electrode 34 over image 14' during such illumination, while under a potential of opposite polarity to the potential applied to the imaging electrode, will result in the transfer of an image, in proper color balance, to the surface of the transfer electrode.

Conversely, an imbalanced color image can be color corrected by selectively transferring, at a relatively greater rate, the remaining photosensitive particles corresponding to the particle (or particles) which has (have) exhibited the unexpected photoresponse. It has been found that this can be achieved by illuminating image 14' with a light source which is richer in light corresponding to the particle which has exhibited the unexpected photoresponse.

For example, if the particle mix previously disclosed is, once again, too red, this selective transfer with the resultant color correction of the final image can be achieved by exposing image 14' during transfer to illumination which is rich in red light (e.g., by passing white light through a red filter). Passage of transfer electrode 34 over image 14' during such exposure, while under a potential of the same polarity as the potential applied to the imaging electrode, will result in the transfer of an image, in proper color balance, to the surface of the transfer electrode. In this manner, more cyan particles will be transferred (in a relative nature) than yellow particles or magenta particles and, in so doing, image 14' will be brought back into color balance. In an analogous manner, if the image appears to be too blue or green when viewed in white light transfer is conducted while the image is subjected to illumination from a light source which is rich in blue or green light respectively. This corrective exposure is made while the transfer electrode, as it passes over image 14', is under a potential of the same polarity as the potential originally applied to the imaging electrode.

As should be clear at this point in the disclosure, there are certain preferred properties for electrodes 11 and 16, these properties being more fully described in S.N. 384,737 now U.S. Pat. 3,384,565. In general, electrode 11 will preferably be capable of accepting injected electrons from a bound particle in the suspension 14 when it (i.e., the particle) is exposed to light so as to allow for a net change in charge polarity on the particle. Electrode 16 will preferably be a blocking electrode which is incapable of injecting electrons into such a bound particle at more than a very slow rate when it comes into contact with the surface of the electrode 16. Obviously, if all polarities in the system are reversed, electrode 11 will preferably be capable of accepting injected holes from bound particles upon exposure to light and electrode 16 would preferably be a blocking electrode incapable of injecting holes into the particles at more than a very slow rate when they come into contact with the surface of this electrode. In this preferred embodiment, electrode 11 may be composed not only of conventional conductive materials such as tin oxide, copper, copper iodide, gold or the like, but may also include many semiconductive materials such as raw cellophane which are not ordinarily thought of as conductors, but which are still capable of accepting injected charge carriers of the proper polarity under the influence of the applied field. Even highly insulating materials such as polytetrafluoroethylene may be placed over the surface of the "injecting" electrode and still be operative because charge which leaves the particles initially bound on this surface upon exposure to light can merely move out of the particles and remain on the insulating surface thereby allowing the exposed particles to migrate. However, the use of the more conductive materials is preferred because it allows for cleaner charge separation in that charge leaving the particles upon exposure can move into the underlying surface and away from the particle in which it originated. This also prevents possible charge build-up on the electrode which might tend to diminish the inter-electrode field.

On the other hand, the preferred embodiment of the blocking electrode 16 is selected so as to prevent or greatly retard the injection of electrons (or holes, depending upon the initial polarity of charge on the particle) into a bound particle when it reaches the surface of this electrode. Accordingly, the surface of this electrode facing suspension 14 in the preferred embodiment may be either an insulator or a semiconductor which will not allow for the passage of sufficient charge carriers under the influence of the applied field to discharge the particles finally bound to it, thereby preventing particle oscillation in the system. Even if this blocking electrode will allow for the passage of some charge carriers through it to the particles, it will still be considered to come within the class of preferred materials if it does not allow for the passage of sufficient carriers to recharge the particles to the opposite polarity because even a discharge particle will tend to adhere to this blocking electrode by Van Der Waals forces. Here again, materials not coming within the preferred class may be employed but they tend to lead to particle oscillation in the system, resulting in lower image density, poor image resolution, image reversal and similar deficiencies, with the degree of these deficiencies, in most instances, depending upon how far the material employed deviates from the preferred class of materials in its electrical characteristics.

Baryta paper and other suitable materials may be employed to surface the blocking electrode and may be wet on their back surfaces with electrically conductive materials.

Although this invention has been described for the most part in connection with a Baryta paper covered imaging electrode 16 and transfer electrode 34, any suitable material having a resistivity of about $10^7$ ohm-cm.$^2$ or greater may be employed, as a preferred material. Typical materials in this resistivity range include cellulose acetate and polyethylene coated papers, cellophane, nitrocellulose, polystyrene, polytetrafluoroethylene, polyvinyl fluoride and polyethylene terephthalate. The terms "blocking electrode" and "injecting electrode" should be understood and interpreted in this context throughout the specification and claims.

Transfer electrode 34 is, in its preferred embodiment, similar in construction to imaging electrode 16, as heretofore set forth. However, it should be understood that any suitable materials can be used which will not adversely affect the transfer of the particle image to the transfer electrode.

Applicable carrier liquids and photosensitive imaging particles, and the preparation and composition of the imaging suspension have already been described in S.N. 384,737 now U.S. Pat. 3,384,565; and that copending application should be referred to for such additional disclosure. A more detailed listing of applicable photosensitive particles can be found in copending application, S.N. 518,041, filed Jan. 3, 1966 now U.S. Pat. 3,383,993 issued May 21, 1968 to S. Yeh, which list is incorporated herein by reference. This latter list is of greatest interest where color originals are being reproduced and, of course, is of particular interest with respect to the manner in which a suspension of a plurality of different photosensitive particles is color corrected for an imbalance in image 14' as heretofore set forth.

It should be understood that the heretofore described processes are applicable to a repetitive or cyclic process, that is, where all or some of the following steps are performed: completely removing the imaging suspension from its supporting electrode after imaging and transfer (e.g., by cleaning the electrode of residual particles that may remain after transfer), applying a new imaging suspension to the electrode, and repeating the imaging and transfer operations at least one additional time.

The following examples are given to enable those skilled in the art to more clearly understand and practice the invention. They should not be considered as a limitation upon the scope of the invention, but merely as being illustrative thereof.

EXAMPLES

All of the following examples are carried out in an apparatus of the general type illustrated in FIG. 1 with the imaging mix 14 coated on a NESA glass substrate through which exposure is made. The NESA glass surface is connected in series with a switch, a potential source, and the conductive center of a roller having a blocking electrode covering of a film of polyvinylidene fluoride. The roller is approximately 2½ inches in diameter and is moved across the plate surface at about 1.45 centimeters per second. The plate employed is roughly 3 inches square and is exposed as described in each particular example.

Example I

A suspension including 1.5 grams of Watchung Red B, a barium salt of 1-(4'-methyl-5'-chloro-azobenzene-2'-sulfonic acid)-2-hydroxy - 3 - naphthoic acid, C.I. No. 15865, available from Du Pont; 2 grams Algol Yellow G.C., 1,2,5,6-di(C,C'-diphenyl) - thiazole - anthraquinone, C.I. No. 67300, available from General Dyestuffs; and 1.5 grams Monolite Fast Blue G.S., the alpha form of metal-free phthalocyanine, C.I. No. 74100, available from Arnold Hoffman Co.; is made up in 50 milliliters of Sohio Odorless Solvent 3440 (a kerosene fraction available from Standard Oil Company of Ohio). These particles are magenta, yellow, and cyan respectively. This mixture, known as tri-mix, is coated on a NESA glass substrate and exposed with a light intensity of 1800 foot candles. A Kodachrome color transparency is placed between the light source and the NESA glass substrate so that a colored image is projected onto this tri-mix as the imaging electrode moves across the surface of the glass. The imaging electrode has a polyvinylidene fluoride covering thereon and the roller is held at a negative potential of 2500 volts with respect to the glass substrate. After the imaging electrode passes over the substrate, an excellent quality subtractive 3-color image corresponding to the Kodachrome transparency is left behind on the glass. A Baryta paper covered transfer electrode which is employed is held at a positive potential of 2500 volts with respect to the glass substrate. After the transfer electrode passes over the remaining particle image left behind on the glass, a good quality image is obtained on the surface of the Baryta paper.

Example II

The procedure of Example I is repeated including exposure of the particle image during transfer to uniform white light from the 1800 foot candle light source. A fair quality image is obtained on the Baryta paper transfer surface.

Example III

The procedure of Example I is repeated including exposing the particle image on the NESA glass substrate during transfer to light which has passed through the original Kodachrome color transparency. A superior quality image is now obtained on the Baryta paper transfer surface.

Example IV

The procedure of Example I is repeated except that the Baryta paper covered transfer electrode is held at a negative potential of 2500 volts with respect to the glass substrate. The poor quality image is obtained on the transfer surface.

Example V

The procedure of Example IV is repeated including exposure of the particle image during transfer to uniform white light from the 1800 foot candle light source. A good quality image is obtained on the transfer surface.

Example VI

A suspension including .75 gram Watchung Red B, as described in Example I: 1.2 grams of a yellow particle N-2''-pyridyl-8,13-dioxodinaphtho-(2,1-b; 2',3'-d) -furan-6-carboxamide; and 1.8 grams Monolite Fast Blue, as described in Example I; is made up in 50 milliliters Sohio Odorless Solvent 3440. These particles are magenta, yellow, and cyan, respectively. The procedure of Example I was followed except that the intensity of the light source is 800 foot candles, the imaging electrode is held at a negative potential of 3,000 volts, and the transfer electrode is held at a positive potential of 3,000 volts. After the imaging electrode passes over the substrate, an excellent quality 3-color image is left behind on the NESA glass, and after the transfer electrode passes over the particle image, a good quality image is obtained on the Baryta paper transfer surface.

Example VII

The procedure of Example VI is followed with the further step of exposing the particle image during transfer to uniform white light from the 800 foot candle light source. A good quality image is obtained on the Baryta paper transfer surface.

Example VIII

The procedure of Example VI is followed with the additional operation of exposing the particle image during transfer to light which has passed through the original Kodachrome color transparency. A superior quality image is obtained on the surface of the Baryta paper transfer paper.

Example IX

The procedure of Example VI is followed except that approximately 2 mol percent 2,4,7-trinitro-9-fluorenone sensitizer is added to the tri-mix suspension. A good quality image is obtained on the NESA glass substrate when a light source of 250 foot candles is used. A good quality image is also obtained on the Baryta paper transfer surface when the particle image is exposed to the 250 foot candle light source during transfer.

Example X

A suspension including equal amounts of Watchung Red B, Algol Yellow GC and Monolite Fast Blue G.S. is made up in Sohio solvent with total particle concentration approximately 7% by weight. This mixture is coated on a NESA glass substrate and exposed with a light intensity of 1800 foot candles. A Kodachrome color transparency is passed between the light source and the NESA glass substrate so that a color image is projected onto this mixture as the blocking electrode moves across the surface of the glass. The blocking electrode has a polyvinylidene fluoride covering thereon and is held at a negative potential of 2500 volts with respect to the glass substrate. After the imaging electrode passes over the substrate, a good quality subtractive 3-color image corresponding to the Kodachrome transparency is produced on the glass; however, the image when viewed in white light appears too green. A Baryta paper covering transfer electrode which is employed is held at a positive potential of 2500 volts with respect to the glass substrate. During the passage of the transfer electrode over the color image left behind on the glass, the image is exposed to visible light which is less intense in the green portion of the visible spectrum. This exposure is achieved by passing white light from the 1800 foot candle source through a Wratten CC .30 magenta filter. A good quality image in proper balance (i.e., corresponding to the original Kodachrome color transparency) is obtained on the surface of the transfer electrode.

Example XI

A suspension including 1.0 grams of Watchung Red B, 1.5 grams of the yellow particle of Example V and 1.25 grams Monolite Fast Blue G.S. is made up in 50 milliliters Sohio Odorless Solvent 3440. The procedure of Example X is followed except that the Baryta paper covering transfer electrode is held at a negative potential of 2500 volts with respect to the glass substrate. After the imaging electrode passes over the substrate, a good quality subtractive 3-color image corresponding to the Kodachrome transparency, except that the image when viewed in white light appears to be too red, is left behind on the glass. During the passage of the transfer electrode over the remaining particle image left behind on the glass substrate, the image is exposed to visible light which is more intense in the red portion of the visible spectrum than in other portions. This is achieved by passing the white light from the 1800 foot candle source through a Wratten red filter. A good quality color corrected image is obtained on the surface of the transfer electrode.

Example XII

The procedure of Example VI is followed with the further step of exposing the particle image during transfer to blue light of approximately 400 m$\mu$ wavelength. This exposure is achieved by passing white light from the 800 foot candle source through a Wratten blue filter. A superior quality image is obtained on the Baryta paper transfer surface.

While the invention has been described with reference to preferred embodiments thereof, it will be understood by those skilled in the art that various changes in form and details may be made without departing from the true spirit and scope of the invention.

It should be understood that the present invention is not dependent upon the exact nature of the photosensitive particles employed, rather any suitable particle composition (either in pure form or admixed with other photosensitive or non-photosensitive materials) or structure may be employed, provided the advantageous results of this invention are not adversely affected.

Further, as will be apparent to those skilled in the art, additional operations may be performed to achieve the herein disclosed results or, in certain circumstances, certain operations may be deleted. The apparatus herein, disclosed may be modified in numerous ways to, once again, achieve the effective transfer heretofore set forth. All such additions, deletions, modifications, etc. are considered to be within the scope of the present invention.

What is claimed is:

1. A method of color correcting an imbalanced color image made up of a plurality of at least two different colored finely divided charged particles in an insulating carrier liquid on a supporting electrode, each of said particles comprising a photosensitive material whose principal light absorption band substantially coincides with its principal photosensitive response, said method comprising exposing said particle image to visible light which is less intense in at least one portion of the visible spectrum and simultaneously with said exposure transferring said particle image from said supporting electrode to the surface of a transfer member by contacting said particle image with said transfer member while applying an electric field across said transfer member and the supporting electrode whereby an image in proper color balance is obtained on the surface of said transfer member.

2. A method according to claim 1 in which the visible light is less intense in that portion of the visible spectrum corresponding to the color which is overrich in the imbalanced color image and the polarity of said electric field applied to said transfer member is the same as the polarity of the electric field applied to said supporting electrode during the imaging operation.

3. A method according to claim 1 in which the visible light is less intense in that portion of the visible spectrum not corresponding to the color which is overrich in the imbalanced color image when the polarity of said electric field applied to said transfer member is opposite to the polarity of the electric field applied to said supporting electrode during the imaging operation.

References Cited

UNITED STATES PATENTS

| | | | |
|---|---|---|---|
| 2,924,519 | 2/1960 | Bertelsen | 96—1.4 |
| 2,940,847 | 6/1960 | Kaprelian | 96—1.4X |
| 2,951,443 | 9/1960 | Byrne | 96—1.4X |
| 2,990,278 | 6/1961 | Carlson | 96—1.4 |
| 3,071,645 | 1/1963 | McNaney | 96—1.4X |
| 3,384,565 | 5/1968 | Tulagin et al. | 96—1.3X |
| 3,414,409 | 12/1968 | Gallo | 96—1.4 |
| 3,442,645 | 5/1969 | Olden | 96—1.4 |

CHARLES E. VAN HORN, Primary Examiner

U.S. Cl. X.R.

96—1, 1.3; 117—37; 204—181